March 29, 1966 H. D. KRAFT ET AL 3,242,924

INFUSION MONITORING DEVICE WITH SNAP ACTION CUT-OFF MEANS

Filed Oct. 11, 1963 6 Sheets-Sheet 1

INVENTORS
Harold D. Kraft
Jack A. Kraft

BY

Carroll B. Quaintance
ATTORNEY

INFUSION MONITORING DEVICE WITH SNAP ACTION CUT-OFF MEANS

Filed Oct. 11, 1963 6 Sheets-Sheet 2

INVENTORS
Harold D. Kraft
Jack A. Kraft

BY [signature]
ATTORNEY

INVENTORS
Harold D. Kraft
Jack A. Kraft

BY Carroll B. Quaintance
ATTORNEY

INVENTORS
Harold D. Kraft
Jack A. Kraft
BY [signature]
ATTORNEY

March 29, 1966 H. D. KRAFT ET AL 3,242,924

INFUSION MONITORING DEVICE WITH SNAP ACTION CUT-OFF MEANS

Filed Oct. 11, 1963 6 Sheets-Sheet 5

INVENTORS
Harold D. Kraft
Jack A. Kraft

BY Carroll B. Quaintance

ATTORNEY

INFUSION MONITORING DEVICE WITH SNAP ACTION CUT-OFF MEANS

Filed Oct. 11, 1963 6 Sheets-Sheet 6

INVENTORS
Harold D. Kraft
Jack A. Kraft
BY Carroll B. Quaintance
ATTORNEY 3,242,924

INFUSION MONITORING DEVICE WITH SNAP ACTION CUT-OFF MEANS

Harold D. Kraft, Flushing, and Jack A. Kraft, New Hyde Park, N.Y., assignors to Scientific Industries, Inc., Queens Village, N.Y., a corporation of Delaware Filed Oct. 11, 1963, Ser. No. 318,477
16 Claims. (Cl. 128—214)

The present invention relates to the art of intravenous infusion, and particularly to a new and improved apparatus for monitoring and controlling the amount of an intravenous infusion.

One of the greatest triumphs of modern medicine has been the mastery of intravenous feeding. Today it is the exceptional hospital patient who, during his stay on a medical or surgical service, does not receive at least one type of infusion. Blood, plasma, saline, glucose, fructose, and other agents are all regularly given intravenously by slow drip in volumes of 500 to 3000 cc. or more when indicated, and innumerable lives have been saved by these agents. Despite the general safety and ease of administration of these fluids, there are problems associated with their use. Among these problems is the controlling of the amount of the infusion over a given time interval and avoiding a complete emptying of the infusion container.

While an unnoticed slowing of the infusion rate has sometimes caused great difficulty, an unnoticed acceleration of the rate is a more frequently encountered problem. Excessive rate of infusion may be due to a flow rate actually faster than intended by the physician, or a rate which proceeds to emptying of the infusion bottle without the knowledge of the medical staff.

During cardiac or renal failure, there is retention of abnormal amounts of fluid in the body and an expanded blood volume. The latter places an extra load on the heart, thus creating a vicious cycle. If one loads the circulatory system too rapidly with intravenous fluids (particularly saline), further cardiac decompensation and full-blown plumonary edema may ensue. This danger is a frequently encountered problem in the older age groups in patients with compromised cardiac reserves due to arteriosclerotic and/or hypertensive heart disease. Nevertheless, in hospital practice one must often administer parenteral fluids to these patients, frequently on an around-the-clock basis. The rate of infusion set by the physician may be inadvertently accelerated by the patient moving his arm and thereby changing the position of the needle tip in relation to the vein wall. Should this occur at night when medical supervision is at a minimum, rapid infusion may continue for a long enough period of time to endanger life.

While performing cardiac catheterization, a slow constant drip of 5% glucose in water under an air pressure in excess of the systemic blood pressure is run through the catheter to prevent clotting within the catheter lumen. During left-sided catheterization, maintenance of such a pressure is always necessary to counterbalance the systemic blood pressure and thus prevent backflow of blood into the catheter. During right-sided procedures, the infusion pressure is generally maintained at this high level prophylactically because of the possibility of meeting high right atrial or right ventricular pressures such as may be encountered in left to right shunts. Particularly in difficult cases, the attending medical personnel may be so busy with the technicalities of the procedure that, occasionally, the infusion bottle runs dry, and air, under a head of pressure of 150 to 200 mm. Hg. or more, is injected intravenously or intra-arterially. The empty infusion bottle may go undetected until the patient develops neurologic signs, abdominal pain, other evidence of air embolism, or sudden death. Particular care is essential in right-sided procedures, not only because they are more frequently performed, but also because the air pressure in the infusion bottle is almost unopposed by the very low central venous pressure.

In some patients—children, patients in shock, etc.—veins accessible for intravenous infusion are at premium. Should the infusion bottle inadvertently run dry, backflow of blood into the needle usually occurs, with clotting and hence occlusion of the needle. The needle must then be removed and another vein sought. If one cannot be found, recourse must be taken to a "cutdown," which is a time-consuming, somewhat mutilating procedure.

Whole blood and some of its derivatives are quite viscous, and flow through an ordinary sized needle (#20–22) very slowly. To expedite the speed of transfusion (e.g., in case of hemorrhagic shock), air is sometimes pumped into the bottle. The danger of air embolism inherent in such cases is more than a potential problem.

In each of the aforementioned conditions, the common denominator is too rapid an emptying of the infusion bottle without the awareness of supervisory medical personnel.

It is an object of the present invention to provide an infusion monitoring device which overcomes the abovementioned difficulty and disadvantages.

It is another object of the present invention to provide a monitoring device that is compart and of simple and reliable construction.

It is another object of the present invention to provide an infusion monitoring device in which a predetermined quantity or amount of intravenous infusion can be discharged from the device, and which predetermined quantity will not be exceeded.

It is another object of the present invention to provide an infusion monitoring device having a signalling system to warn physicians and attendants that the predetermined quantity of intravenous infusion has been discharged therefrom.

It is another object of the present invention to provide an infusion monitoring device that is capable of preventing infusion in a larger quantity than that prescribed or intended by the physician, even though there is no physician present at the monitoring device after the predetermined quantity has been discharged by the device.

It is another object of the present invention to provide an infusion monitoring device which will stop or cut off the flow or discharge of infusion liquid to the patient when the contents of the bottle have reached a predetermined level or quantity.

Another object of the present invention is to provide an infusion monitoring device which will prevent the complete emptying of the bottle of fluid being infused without requiring supervisory personnel in the vicinity to actually operate the monitoring device in order to stop the flow of fluid from the device.

It is another object of the present invention to provide an infusion monitoring device which is a self-contained unit and will stop the discharge or flow of fluid from a bottle by itself and which does not depend upon any external power outlet or source to accomplish this.

It is another object of the present invention to provide an infusion monitoring device in which a predetermined quantity or amount of intravenous infusion will be discharged from the infusion bottle after which the discharge tube leading therefrom will be pinched or clamped off by mechanical means embodied within the infusion monitoring device.

It is another object of the present invention to provide an infusion monitoring device that is capable of discharging a predetermined quantity of liquid from an infusion bottle which device operates in a completely mechanical manner.

It is another object of the present invention to provide a mechanical infusion monitoring device provided with biasing means for clamping or pinching off the discharge tube after a predetermined quantity of infusion liquid has been discharged therethrough, which biasing means can be readily adjusted to vary the predetermined quantity of infusion liquid to be discharged from the device.

It is another object of the present invention to provide a mechanical infusion monitoring device with calibration means so that the device can be preset to discharge predetermined quantities of infusion liquid therefrom by varying the tension or force in the biasing means associated with the device.

It is another object of the present invention to provide an infusion monitoring device that is completely mechanical and is provided with means for metering or discharging various quantities of infusion liquid, for example, in increments from 50 mm. to 1000 mm. by merely presetting or calibrating the biasing means before the infusion liquid is ready to be discharged therefrom.

It is another object of the present invention to provide an infusion monitoring device with spring-loaded rod means which clamp off the discharge tubing from which the infusion liquid flows when a predetermined quantity of infusion liquid has been discharged therethrough.

It is another object of the present invention to provide an infusion monitoring device for metering out of a bottle a predetermined quantity of infusion liquid, which bottle is connected to a pivoted lever means, which lever means is actuated by a spring-loaded rod means for clamping off the infusion liquid discharge tube when a predetermined quantity of infusion liquid has been discharged from the bottle.

It is another object of the present invention to provide a positive type mechanical infusion monitoring device which has a discharge tube through which a predetermined quantity of infusion liquid is flowed and which tube is pinched off or clamped off upon a predetermined decrease in the weight of the bottle of infusion liquid, and a pivoted lever is caused to move about its pivot at this time to positively and directly pinch off the tube.

It is another object of the present invention to provide an infusion monitoring device that is completely mechanical and includes biasing means for actuating rod means to pinch off the discharge tube through which infusion liquid flows, with adjustment means for varying the tension in the biasing means in order to permit the device to discharge varying predetermined quantities of infusion liquid.

It is another object of the present invention to provide a completely mechanical infusion monitoring device for stopping the flow of a predetermined quantity of infusion liquid from an inverted liquid infusion bottle which may be connected to the usual flexible tube and injection needle, and may be supported from a pivoted lever, in which the pivoted lever is set off to pinch off the flow of infusion liquid through the flexible tube, which device is provided with over-center spring-actuated pressure lever means for supplying a greater force than is normally exerted upon the pivoted lever when it is set off to stop the flow of the predetermined quantity of infusion liquid through the tube.

It is another object of the present invention to provide pivoted lever means which support an inverted bottle of infusion liquid with biasing means operatively connected to the pivoted lever to clamp off or shut off the flow of infusion liquid through a flexible tube when a predetermined quantity of infusion liquid has flowed through the flexible tube, which device is provided with a quick-acting triggering mechanism which pushes or exerts an additional force upon the pivoted lever, which force is greater than the force normally exerted on the pivoted lever to shut off the flexible tubing through which the infusion liquid flows.

It is another object of the present invention to provide an infusion monitoring device having a pivoted lever means with an inverted bottle containing infusion liquid suspended from one end thereof, and adjustable means acting upon the other end of the pivoted lever means tending to counterbalance the weight of the infusion bottle with an over-center spring-actuated pressure lever means operatively connected to said pivoted lever means for actuating said pivoted lever means in a snap action manner to cause the pivoted lever means to clamp off or pinch off the discharge tube through which the infusion liquid flows in a substantially instantaneous manner.

It is another object of the present invention to provide an over-center spring-actuated pressure lever means operatively connected to a pivoted lever means having an inverted bottle of infusion liquid suspended from one end thereof and an adjustable biasing means acting upon the other end of the pivoted lever means and tending to counterbalance the weight of the infusion bottle, which over-center spring-actuated pressure lever means is provided with channel member means, and constantly bears against the pivoted lever means but is inoperative until the channel means is pivoted a certain distance so as to push the pivoted lever means upward at one end with a greater force than is normally exerted upon it by the adjustable biasing means.

It is another object of the present invention to provide and infusion monitoring device comprising a pivoted lever with an inverted infusion bottle suspended from one end thereof and biasing means and rod means connected to the other end thereof for pinching off a flexible tube through which infusion liquid from the inverted bottle flows, which structure operates completely mechanically, with over-center spring-actuated pressure lever means operatively connected to the same end of the pivoted lever means as the inverted bottle and bearing thereagainst provided with a ball bearing means having its centerline or axis normally disposed slightly above the bottom edge of the pivoted lever means, so that when the weight of the infusion liquid in the bottle diminishes and the pivoted lever has its end adjacent the over-center spring-actuated pressure lever means raised, and the lower edge of the pivoted lever means rides above the centerline of the bearing means, the bearing means will ride underneath the pivoted lever means and force or push it upwardly with a greater force than is normally exerted upon the pivoted lever means to provide a snap action or triggering means to cause the rod means to pinch off or squeeze off the flexible infusion tube to stop the flow of infusion liquid therethrough.

It is still another object of the present invention to provide an infusion monitoring device that operates completely mechanically comprising a pivoted lever with an inverted infusion bottle suspended from one end thereof and biasing means and rod means operative connected to the other end thereof, with the biasing means acting upon the pivoted lever means and tending to counterbalance the weight of the infusion bottle, with arm means through which the rod means is slidably disposed and the biasing means has one end fixed to the arm means, and collar means for attaching the other end of the biasing means to the rod means, with threaded means adapted to adjust the arm means so as to vary the force or tension in the biasing means to set the pivoted lever for actuation at a predetermined time when a predetermined amount of infusion liquid has been discharged from the bottle through a flexible tube to shut off or clamp off the tube and stop the flow of infusion liquid therethrough.

It is another object of the present invention to provide an infusion monitoring device comprising a pivoted lever having an inverted infusion liquid bottle suspended from one end thereof and rod means and biasing means operatively connected to the other end of the pivoted lever to clamp off or squeeze off the flow of infusion liquid through a flexible tube with adjustable means consisting of a tubular adapter member with an insert member therein fixed to one end of the biasing means which adapter member can be readily adjusted to vary the force and tension in the biasing means so as to adjust the pivoted lever to be actuated when different predetermined quantities of infusion liquid have been dispensed from the inverted bottle.

It is another object of the present invention to provide an infusion monitoring device with slidable lift means in the lower end thereof for properly maintaining the flexible infusion tube in the apparatus.

It is another object of the present invention to provide an infusion monitoring device having a pivoted lever with one end thereof operatively connected to biasing means, and rod means for closing off the flow of infusion liquid through a flexible tube, and the other end of the pivoted lever disposed so as to suspend an inverted bottle of infusion liquid therefrom with by-pass means for continuously flowing a minute amount of infusion liquid through the flexible tube after it is pinched off.

It is another object of the present invention to provide a compact infusion monitoring device that operates completely mechanically and is provided with clamp means for readily attaching the device to conventional intravenous feeding stands.

Various other objects and advantages of the present invention will be readily apparent from the following detailed description when considered in connection with the accompanying drawings forming a part hereof and in which.

Figures 1, 2:
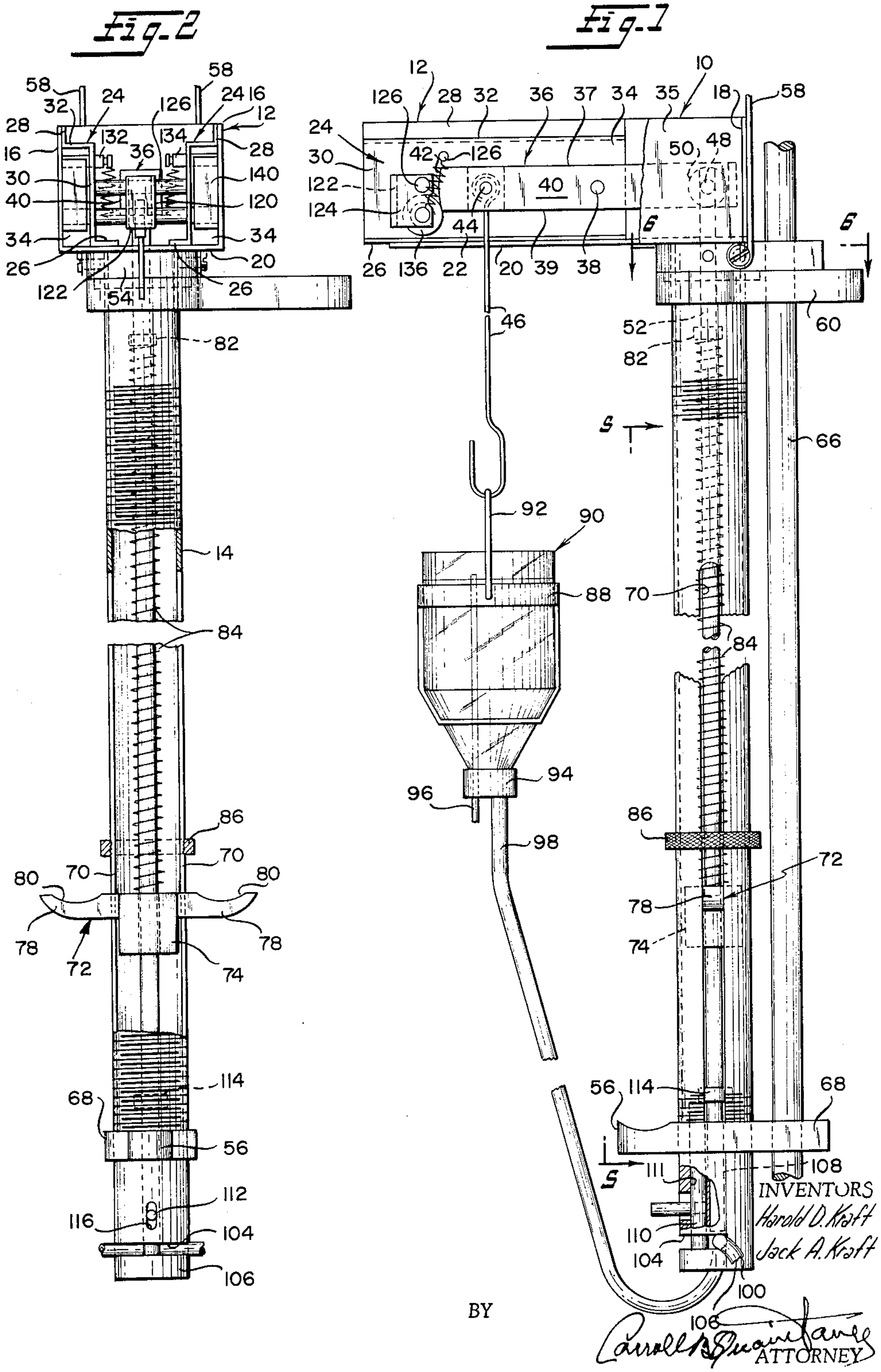
FIGURE 1 is a side elevational view of an infusion monitoring device of the present invention.
FIGURE 2 is a front elevational view of the infusion monitoring device of the present invention with the infusion bottle removed for purposes of clarity.

Referring to the embodiment of the invention shown in FIGURES 1 and 2, the reference numeral 10 generally designates an infusion monitoring device provided with a substantially horizontally extending rectangular shaped housing or casing 12 with a rear vertical post, standard or tube 14 secured to the rear end thereof by any suitable means and extending downwardly therefrom. As best shown in FIGURE 2, the housing 12 is provided with identical opposite vertical side walls 16 and rear wall 18, and a horizontal bottom 20. The top of the housing is open as well as the front of the housing so as to receive a detachable cover member thereon omitted for purposes of clarity. The housing may be made of thin gauge sheet metal or the like. Disposed adjacent the front portion 22 of the housing are two partitions or thin plate members 24. The partitions 24 (see FIGURES 8 and 9) are disposed on opposite sides of the housing and are provided with lower legs 26 secured to the bottom 20 of the housing and upper legs 28 secured to the side walls 16 of the housing. The partitions are provided with a vertical portion 30 and a horizontal portion 32 so that the vertical portions 30 are spaced from the side walls 16 to provide two compartments 34 extending along the inner sides of the housing 12, as best shown in FIGURE 2, from the front to the rear, but spaced as indicated at 35 from the rear wall 18.

A horizontal pivoted lever 36 is disposed within the housing between the plates 24, as best shown in FIGURES 1 and 2. The lever 36 is pivoted in the housing about a pin 38 which extends through the opposite sides 40 of the lever. The opposite ends of the pin 38 are secured by any suitable means to the vertical portion 30 of the plate 24. The pin 38 is connected to the lever 36 at approximately its midpoint, as best seen in FIGURE 1. The top 37 and the bottom 39 of the lever are substantially horizontal so that with the opposite sides 40 the lever 36 is substantially a box shape. The front end of the lever is provided with a rounded, curved, or arcuate front wall 42 against which a roller bearing member, as hereinafter described, is adapted to roll. The front portion of the lever is provided with a pin member 44 (FIGURES 1, 3 and 4) for suspending a bottle hook 46 therefrom. The rear of the lever 36 is provided with another pin member 48 secured thereto having a bearing 50 to which is secured an elongated vertical rod 52 extending downwardly into tube 14.

Figure 7:
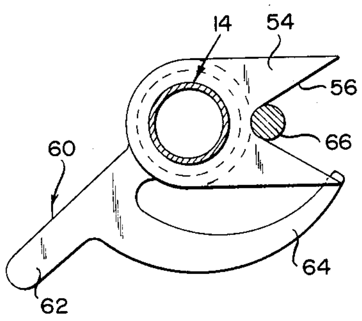
FIGURE 7 is a view similar to FIGURE 6 but illustrating the direction of movement of the clamp for securing the monitoring device to the intravenous stand.
Figure 6:
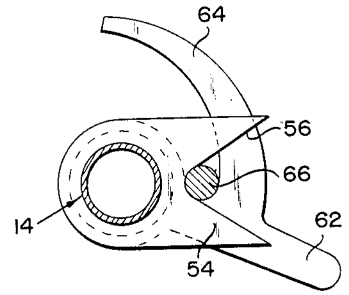
FIGURE 6 is a view of the clamping means taken along the lines 6—6 of FIGURE 1 for attaching the device to an intravenous feeding stand, and showing the device in a clamped position.

A suspension member 54 is disposed on the bottom of the housing for suspending the housing by bails 58 from the cross bar, not shown, of the intravenous stand. It will be noted that the suspension member 54 is provided with an aperture in the rear portion thereof, as shown in FIGURE 7, so that the rear post or hollow tube 14 extends therethrough. A clamping member 60, as best shown in FIGURES 6 and 7, having a handle 62 and a clamping tooth 64 is provided below the suspension member 54 for clamping the monitoring device to the vertical rod or bar 66 of the intravenous stand. A V-shaped groove 56 in member 54 permits the rod 66 to vary in diameter so that the device can be clamped to intravenous stands of different sizes. If desired, the monitoring device may have other bails similar to the bails 58 disposed on the front end thereof for clamping it to the cross rod or bar of an intravenous stand. It will be noted that the device is also provided with a lower suspension member 68 similar to the upper suspension member and provided with a similar V-shaped groove for supporting the lower end of tube 14 against the lower end of the vertical rod 66.

The clamping member 60 is provided with a torsion spring or other similar means so that it is normally biased into a closed position or a clamping position as shown in FIGURE 6, and in order to detach or disconnect the monitoring device from the vertical rod 66 the operator must pull the handle 62 forward or into the position shown in FIGURE 7 to release the monitoring device from the rod 66.

Referring to FIGURES 1 and 2, the hollow tube 14 is provided with elongated vertical slots 70 on opposite sides thereof and disposed in alignment with each other. The slots 70 extend from a point adjacent the lower end of tube 14 for a distance approximately three-quarters of the length of the tube 14.

A narrow arm member 72 (see FIGURES 1 and 2) is disposed within the hollow tube 14 and is provided with a cylindrical portion 74 having a central aperture or passage 76 extending therethrough, through which the rod 52 extends in a sliding fit. The arm member is provided with cross bars or arms 78 adjacent the upper end of the cylindrical portion 74 and extending through the slots 70 substantially beyond the opposite sides of the tube 14. The cross bar members 78 are provided with finger recesses 80 therein.

A collar member 82 is secured to the upper end of rod 52 which extends therethrough, and has the upper end of a spring or biasing member 84 secured thereto. The spring member 84 is mounted over the rod 52 as clearly shown in FIGURES 1 and 2, and has its lower end secured to the cylindrical portion 74 of the arm member 72. The spring member 84 under tension serves as a biasing means for acting on the pivoted lever 36 to counterbalance the weight of an infusion bottle suspended from the hook 46, as hereinafter described.

The outer surface of the tube 14 is threaded and a knurled adjusting nut 86 is threaded thereon. The tension or force in the biasing means 84 is increased or decreased as desired a predetermined amount by threading the nut 86 against the upper side of the arm member 72 after the spring 84 has been elongated a predetermined amount by pulling the cross bars 78 by hand downwardly along the slots 70. The spring member 84 is calibrated at the factory by determining the spring length and the amount of elongation required to increase the tension or force of the spring. For example, the weighing spring 84 may be designed to create a tension of 25 grams from every one-eighth inch that it is elongated.

A bottle cage 88 adapted to support an inverted bottle 90 of infusion liquid with a handle 92 is provided for support on the hook 46. The bottle 90 includes a top or stopper 94 through which a tube 96 extends to prevent the bottle from becoming air-locked and for venting the bottle when it is dispensing liquid therefrom. A flexible tube 98 leads from the top 94 of the bottle for discharging the infusion liquid in the bottle through it. The lower end of the flexible tube 100 extends through a horizontal recess 102 disposed in the lower portion 106 of the tube 14. The recess 102 is disposed in alignment with the rod 52 and the tube 100 is inserted in the recess through a horizontal slot 104 in the front of portion 106. It will be noted that the lower cylindrical portion 106 of the tube 14 is solid, and has a central bore 108 therein through which the lower end of the rod 52 extends in a sliding fit. The lower end of the bore 108 communicates with the recess 102.

A vertical lift rod or member 110 is disposed in another bore 111 in the bottom portion 106 of the tube 14 and is provided with a horizontal knurled lift handle 112. A collar 114 is secured to the lower end of the rod 52 above the lower suspension member 68 as best shown in FIGURES 1 to 4. The lift rod 110 can be slid or moved upwardly and downwardly by lifting the handle 112. Raising the lift rod will cause its upper end to contact the collar 114 and move the rod 52 upwardly so as to cock or set the pivoted lever 36 in a horizontal position when the device is ready to be placed in operation. An elongated vertical slot 116 is provided in the front of tube portion 106 so that the handle 112 can be moved axially with respect to the tube 14. The lower end of 110 is raised clear of the slot 104 when the handle 112 is moved to its uppermost position in the slot 116 so that the flexible tube 100 can be readily inserted into the recess 102 to place the device in operation.

Figure 4:
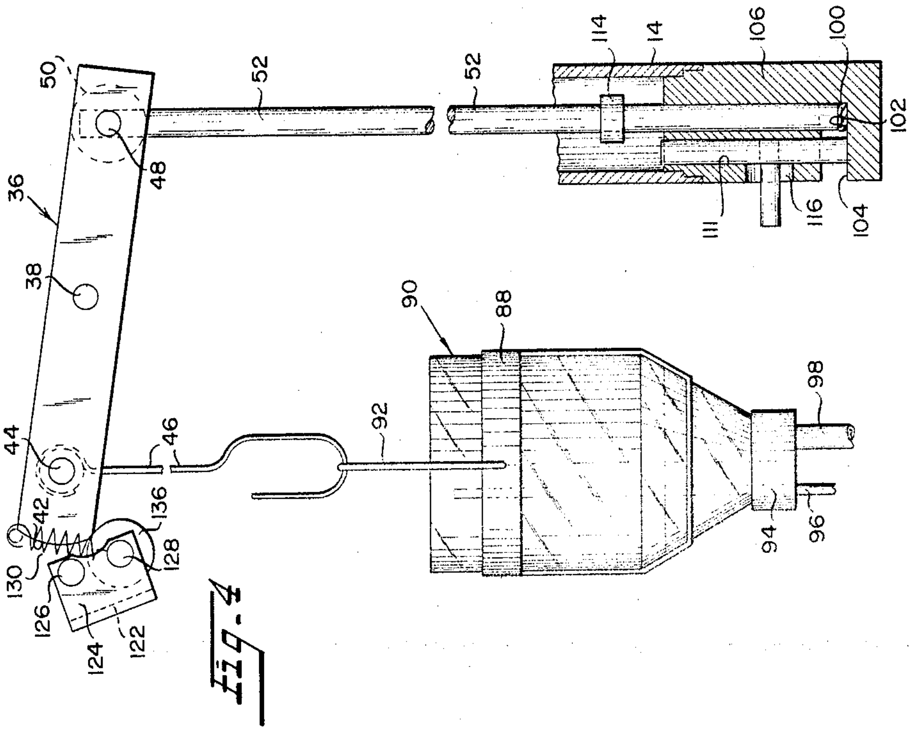
FIGURE 4 is a fragmentary view similar to FIGURE 3 but illustrating the position of the pivoted lever when the pivoted lever has been actuated to pinch off the tube.
Figure 8:
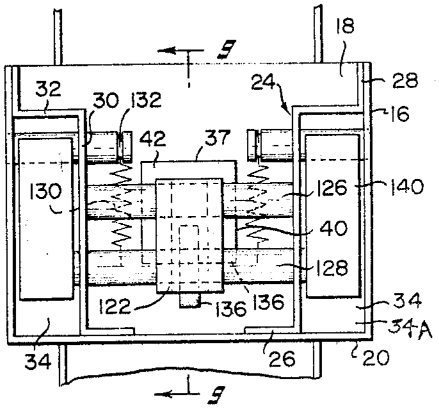
FIGURE 8 is an enlarged fragmentary detail view of the over-center spring-activated pressure lever embodied in the present invention.
Figure 9:
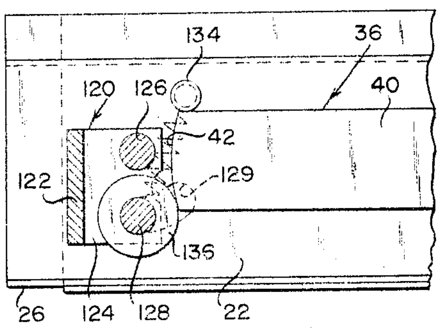
FIGURE 9 is a view taken along line 9—9 of FIGURE 8.

The reference numeral 120 (see FIGURES 8 and 9) generally designates an overcenter spring-actuated pressure lever means or a triggering device or snap action device for pushing the front end of the pivoted lever 36 upwardly with a greater force than is normally exerted upon it by the biasing means 84. The device 120 consists of a channel member having a vertical front leg 122 extending transversely of the housing 12 and two vertical side legs 124 disposed at opposite sides of 122 and extending in a direction toward the rear of the housing or toward the rod 52. The device 120 is positioned forwardly of the curved or rounded front wall 42 of the lever 36 and in alignment therewith. The device 120 is provided with a horizontally extending pivot pin 126 having its opposite ends carried in any suitable manner in the vertical portion 30 of the plate member 24. The device 120 is provided with another pin member 128 disposed below the pivoted pin 126 in vertical alignment therewith. The pin 128 has its opposite ends extending through arcuate slots 129 disposed in portions 30 of the plate members. The slots 129 are to provide clearance for pin 128 to actuate a switch 140 (FIGURE 8). Two switches may be incorporated, one on the left and one on the right of the casing or housing. The lower ends of two spring or biasing members 130 are secured to the opposite sides of the pin 128 adjacent each side of legs 124. The upper ends of the spring members 130 are secured by any suitable means in recesses 132 of two horizontal pin members 134. The pin members 134 are secured to the vertical portions 30 of the plate members 24 in a rigid manner. A ball bearing 136 is disposed in the middle of pin member 128 in alignment with the pivoted lever 36 and the front wall 42 thereof. The ball bearing 136 is adapted to engage in rolling contact with the front wall 42 and the bottom edge 39 of the pivoted lever. The pin 128 and the roller bearing 136 have their central longitudinal axis or centerline disposed in a plane just above the plane of the bottom edge 39 of the lever 36 when the lever is disposed in the horizontal position shown in FIGURES 1 and 3. At this time, the spring members 130 are constantly exerting an upward pull on the ball bearing 136, but due to the fact that the centerline of the ball bearing and the longitudinal axis of the pin member 128 are disposed slightly above the bottom edge 39 of the pivoted lever 36 at this time, the pivoted lever will not be cocked or forced upwardly by the ball bearing and biasing spring members. However, once the rod 52 and the biasing spring 84 of the monitoring device pivot the lever 36 so that the front bottom edge 39 of the pivoted lever moves above or rides above the centerline of the bearing and the pin member 128, the ball bearing 136 will ride underneath the front end of the pivoted lever 36, as best shown in FIGURE 4, and will push the lever upwardly with a greater force than is normally exerted upon the lever 36 by the biasing spring 84. This additional upward force is generated by the biasing springs 130 connected to opposite sides of the pin member 128. The channel member will pivot about the pin member 126 as is clearly shown in FIGURE 4. The quick triggering or snap action of the device 120 against the pivoted lever 36 will cause it to slam or bang downwardly and pinch off the lower portion 100 of the infusion liquid tube instantaneously and positively shutting off the flow of liquid therethrough, the pinched off tube being best illustrated in FIGURE 4.

Figure 18:
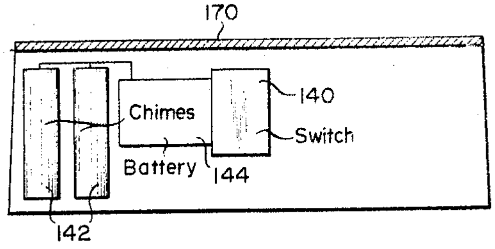
FIGURE 18 is a schematic view of a signal device embodied in the cover of the infusion monitor of FIGURE 10.
Figure 17:
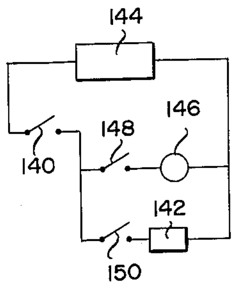
FIGURE 17 is a schematic wiring diagram of an electrical circuit for signal means embodied in the infusion monitoring device of the present invention.

The housing 12 is also provided with a mercury switch 140 in the front end thereof actuated by the pin member 128 and disposed laterally between the vertical portion 30 of the plate member 24 and the side wall of the housing and adjacent the space indicated as 34A so that when the pivoted lever 36 is tripped and pivots to cut off the flow of infusion liquid passing through the flexible tube, a chime 142, as shown in FIGURE 17, may ring. Referring to FIGURE 17, the electrical circuit is shown wherein the closing of the switch 140 by pivoting of lever 36 to the position shown in FIGURE 4 energizes a circuit provided with a source of electrical energy through a battery 144 to light a warning signal 146 which may be a light bulb, or actuate the chime 142, depending upon which of the switches 148 or 150 disposed in the housing has been closed. The battery chime and the light bulb may be disposed with a cover, as shown in FIGURE 18, which fits on the housing.

Figure 5:
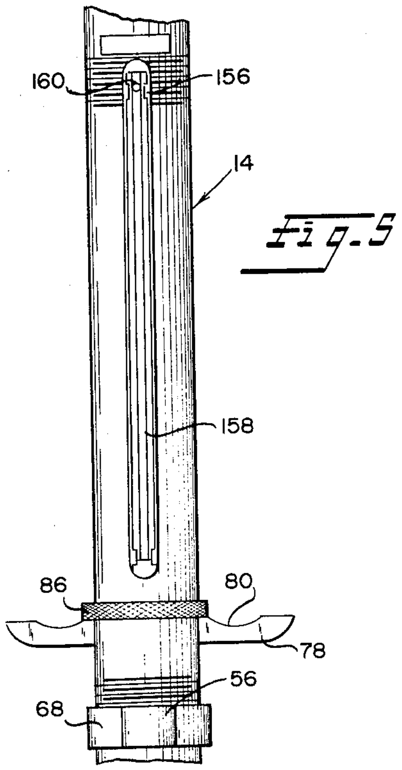
FIGURE 5 is a view taken along the line 5—5 of FIGURE 1 illustrating the scale disposed on the front of the device.

The front of the tube 14 is provided with a milled slot or recess 156 (FIGURE 5) countersunk or recessed within the threads of the tube and in which is disposed an aluminum etched plate 158. The plate or scale 158 is held in the milled recess by a nut and screw 160, and the scale may be adjusted slightly upwardly and downwardly in the recess. The scale contains preferably three separate graduations, namely for a 250 milliliter, 500 milliliter, and 1,000 milliliter container. The scale is preferably graduated in increments of 50 milliliters. The spring 84 is calibrated at the factory by determining the spring length and its amount of elongation required for each per unit rate increase.

In operation, before using the infusion monitoring device, compensation is first made and the device is adjusted for the particular manufacturer's bottle to be used with the device. The device is adjusted by first threading the adjustment nut 86 on the tube 14 to the upper part of the scale adjacent the upper end of the tube 14. The full infusion bottle 90 is then inverted and hooked onto the suspension hook 46 and the hook 46 is pulled downwardly to cock the clamping mechanism and the pivoted lever 36 in the position shown in FIGURE 3. Thereafter, the adjusting nut 86 is threaded slowly downwardly along the tube 14 until the bottle 90 and the hook 46 jump up. This operation compensates for the weight of this bottle plus liquid. Thereafter, this same bottle containing the full measure or quantity of infusion liquid therein is now pulled donwardly to cock the device. The scale is adjusted for the particular volume of bottle being used so that the scale reading is zero. Thereafter the adjusting nut 86 is fed up until the particular amount of liquid or the particular volume desired to be delivered from the infusion container or bottle upon completion of the infusion corresponds with the scale reading. For example, if a 500 milliliter bottle is disposed on the monitoring device and it is desired to discharge 300 milliliters therefrom, the adjusting nut 86 is threaded until a force in the spring will cause the hook 46 to jump up when 200 milliliters have been left in the bottle. When this procedure has been followed the device is ready for use.

Figure 3:
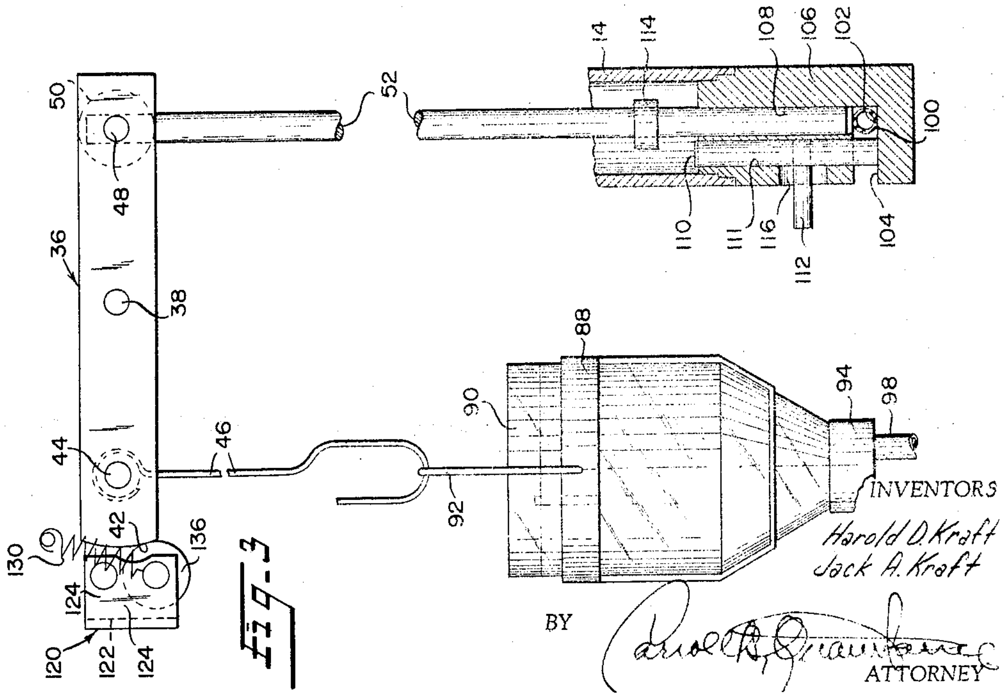
FIGURE 3 is a fragmentary side elevational view illustrating the position of the pivoted lever of the monitoring device when the infusion liquid is flowing through the flexible tube and before a predetermined quantity of liquid has been dispensed from the inverted bottle.

The flexible tube 98 has its lower end inserted into the recess 102 after the lift handle 112 is raised upwardly so that its upper end contacts the collar 114 on the rod 52 and cocks or sets the device in the position shown in FIGURE 3. The handle 112 is raised by grasping the underside thereof with the forefinger and using the thumb to grasp the thumb rest provided in the lower suspension member 68. The cocking of the pivoted lever 36 will move it from the position shown in FIGURE 4 to the position shown in FIGURE 3 with the front wall 42 of the lever riding over the ball bearing member 136 to the position shown in FIGURE 3, at which position the centerline of the ball bearing is slightly above the bottom edge 39 of the pivoted lever. When the handle 112 is released, it, of course, will fall by gravity downwardly so that the lower end 100 of the flexible tube is securely disposed within the recess in the bottom portion 106 and will not inadvertently fall out of it. It is realized at this time, of course, that the flexible tube 98 may be pinched off by a conventional well-known clamp means used in the medical field until the device is ready for operation.

The cocking of the clamping or pivoting lever 36 will dispose the bottom end of the rod 52 above the flexible tube so that it will not be in contact therewith at this time until the proper amount of infusion liquid has been discharged from the bottle 90, at which time its liquid content will be less than it was originally.

As the infusion liquid is dispensed through the flexible tube 98 and the bottle progressively empties to the predetermined amount of liquid content desired to be left in the container upon completion of the infusion, or, in other words, when the predetermined quantity of liquid is dispensed from the container, the pivoted lever 36 will be pivoted from the position shown in FIGURE 3 to the tripped position shown in FIGURE 4. The cocking of the lever 36 is accomplished by the biasing spring 84 continuously tending to pull the rod 52 downwardly, and as the tension in the spring 84 increases above the weight of liquid remaining in the container, the rod 52 will be pulled downwardly and the hook 46 will jump upwardly. The lower end of the rod 52 will impinge upon the flexible tube and pinch off or close off the lower end 100 of the tube, as shown in FIGURE 4, with the lower portion of the rod 52 sliding through the bore 76 (FIGURE 2) in the arm member 72 and through the bore 108 (FIGURE 1) in the lower portion 106 of the tube.

At this time the front curved end 42 of the pivoted lever 36 rolls or rides upward over the ball bearing member 136, so that the lever's lower edge 39 moves above the centerline or axis of the pin member 128 and the roller bearing 136 to actuate the overcenter spring-actuated pressure lever means 120. Thus, the ball bearing member 136 will ride underneath the front end of pivoted lever 36 and snap or trigger the lever upwardly so that the pivoted lever has its rear end and rod 52 simultaneously triggered or snapped downwardly so that the lower end of the rod 52 actually slams or bangs into the flexible tube providing a positive action clamp-off or pinch-off.

The pivoting of the lever 36 from the position shown in FIGURE 3 to the position shown in FIGURE 4 will cause the mercury switch 140 to move from its open circuit condition when the lever is horizontally disposed as in FIGURE 3 to its closed circuit condition when the lever is in the pivoted non-horizontal position shown in FIGURE 4. The closing of the switch will then energize the chime 142 or light a bulb 146, or simultaneously light the bulb if switches 148 or 150 are closed at this time, as desired.

Figures 10, 11:
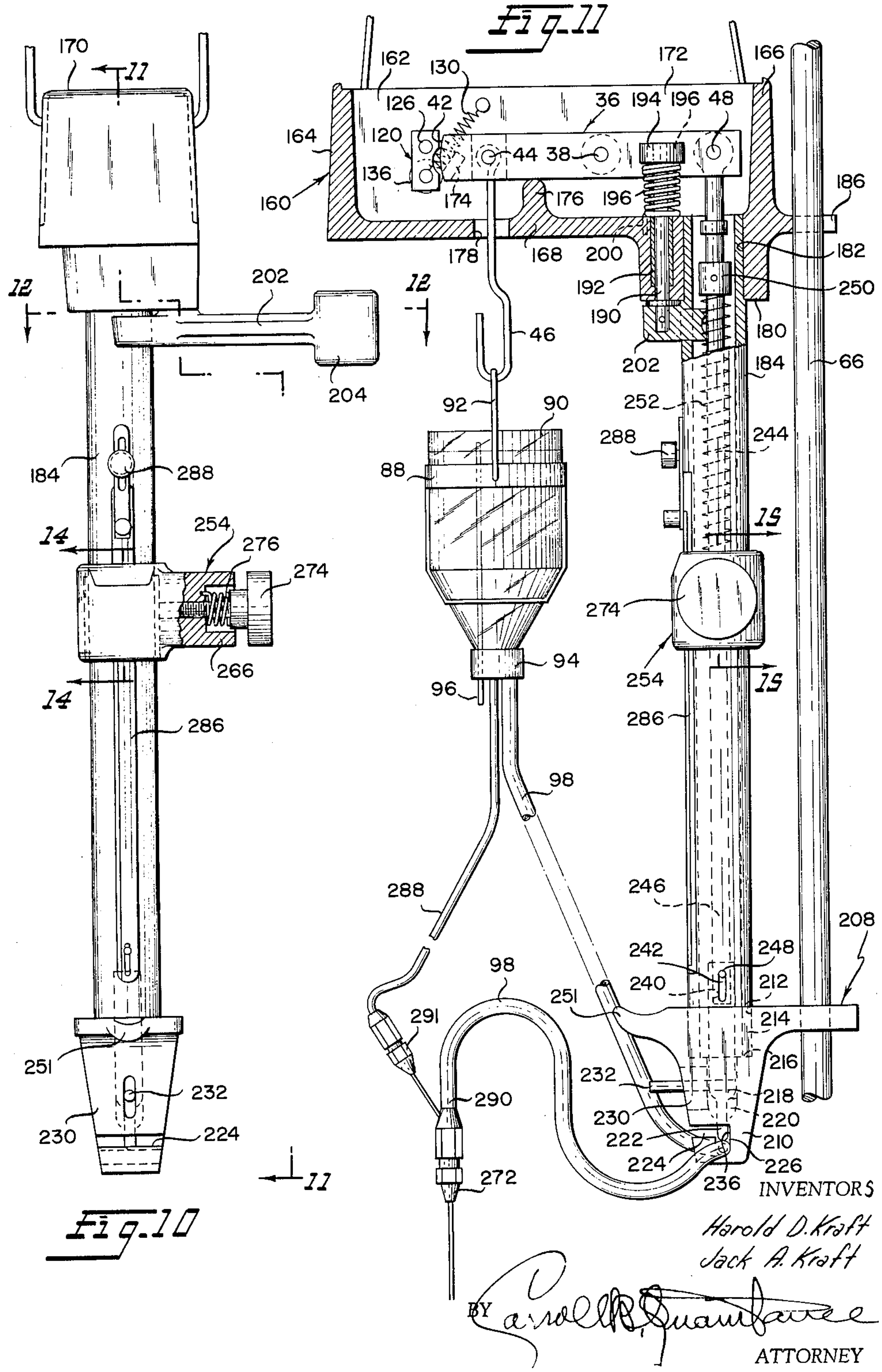
FIGURE 10 is a front elevational view partly in section of a modification of the invention illustrated in FIGURE 1.
FIGURE 11 is a side elevational view partly in section taken along the line 11—11 of FIGURE 10.

The embodiment of the invention shown in FIGURES 10 and 11 is substantially the same in principle and operation as that described in connection with FIGURES 1 and 2; and therefore the individual parts in FIGURES 10 and 11 that are identical to the parts in FIGURES 1 and 2 will be given the same reference numerals.

The housing 160 shown in FIGURES 10 and 11 consists of a substantially rectangular shaped hollow elongated horizontal member having opposite side walls 162, a front wall 164, a rear wall 166 and a bottom 168 formed from a single piece casting or machined part. The top of the housing is open and a complementary cover member 170 is provided that fits over the housing to close off the interior chamber 172 formed therein. The pivoted lever 36 is disposed in the chamber 172 and is provided with pin members as already described in connection with the embodiment of the invention shown in FIGURES 1 and 2. The front end of the pivoted lever 36 is also provided with a diagonally disposed pin member 174 insert therein to act as a wear surface in contacting the ball bearing member 136.

The bottom 168 of the housing is provided with a vertical or upwardly extending portion which acts as a stop when the pivoted lever is disposed in a horizontal position. An opening 178 is provided in bottom 168 through which the bottle hook 46 extends. The rear portion of the housing is provided with a downwardly extending boss 180 provided with a vertical bore 182 therein for receiving the upper end of the hollow cylindrical rear post or tube 184.

Figure 12:
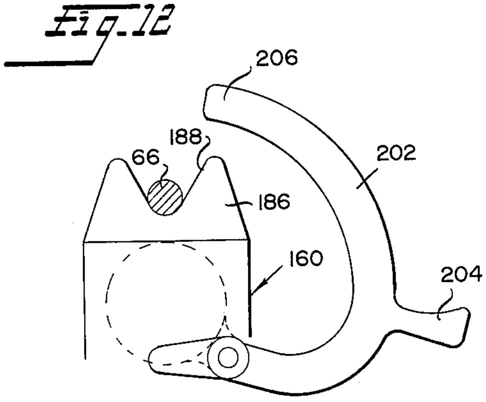
FIGURE 12 is a view taken along the line 12—12 of FIGURE 10 illustrating the manner of clamping the infusion device to an intravenous stand.
Figure 13:
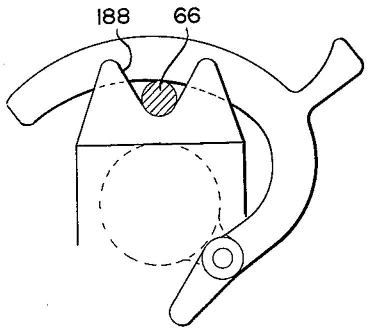
FIGURE 13 is a view similar to FIGURE 12 illustrating the monitoring device actually clamped to the stand.

The rear wall 166 of the housing is provided with a horizontally extending suspension member 186 with a V-groove 188 therein, as best seen in FIGURES 12 and 13, for connecting the monitoring device to vertical rod 66 of an intravenous stand. The boss or sleeve 180 is also provided with another vertical bore extending therethrough forwardly of bore 182 to receive the shaft 190 of a clamping mechanism (FIGURES 12 and 13) for securing the monitoring device to the vertical rod 66. The shaft 190 is journalled in a bushing 192 in this bore and a head 194 on the shaft receives one end 196 of a torsion spring 198. The lower end 200 of the torsion spring is fixed in a recess in the bottom 168 of the housing. The lower end of shaft 190 is fixed by a pin to a curved or arcuate clamping member 202, as best seen in FIGURES 12 and 13, provided with a handle 204. The torsion spring continuously biases or urges the clamping member 202 into the position shown in FIGURE 13, at which time the monitoring device is clamped to the rod 66. In order to release the clamping member 202 from the rod 66, the operator moves the handle 204 against the force of the torsion spring 198 tending to close it, and when the outer end 206 of the clamping member clears the rod 66 the monitoring device may be disconnected and removed therefrom.

The lower end of the rear post or tube 184 is provided with a lower suspension member 208 extending outwardly from a member 210 disposed on the lower end of the tube 184. A V-groove is provided in the lower suspension member 208 identical to the groove already described in connection with the upper member 186 to receive the lower end of the rod 66 therein.

Figure 16:
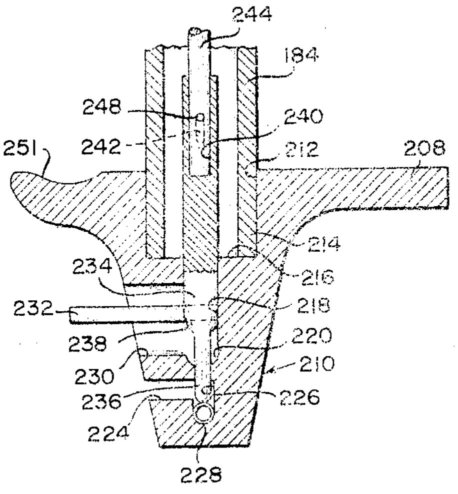
FIGURE 16 is an enlarged fragmentary detailed view of the lower end of the device shown in FIGURE 11.

Member 210 (see FIGURE 16) is substantially a truncated cone configuration having its larger diameter adjacent its upper end with a cylindrical recess 212 disposed in the top thereof for receiving the lower end 214 of the tube 184. The tube may be secured or fixed to the truncated member 210 by any suitable means such as set screws, welding or brazing and seats on the bottom 216 of the recess 212. The member 210 is provided with a countersink recess or bore 218 therein of smaller diameter than the recess 212 and extending downwardly below the bottom 216 of the recess 212. The lower end of recess 218 is curved inwardly or reduced as indicated at 220 and terminates in a small drilled bore 222 extending below 220.

A substantially horizontal transverse slot 224 is provided in the front face of member 210 and extends rearwardly thereof into a vertical transverse slot 226 extending completely through the member 210. Slot 226 has a rounded or cylindrical bottom 228 for receiving the flexible tube 98 therein, and communicates with the slot or bore 226 and is in vertical alignment therewith. The flexible tube 98 is disposed in the slot 226 by inserting it through the slot 224 and pushing it down into contact with the cylindrical bottom 228 of the slot 226.

A narrow vertical slot 230 is provided in the member 210 above the horizontal slot 224 and the knurled horizontal handle 232 of a lift rod or lift member 234 extends therethrough. The lift rod 234 has a lower neck portion 236 on the bottom thereof and an enlarged upper cylindrical rod portion 238 thereabove. The cylindrical portion 238 and the neck portion 236 of the lift rod are of smaller diameter than the recesses 218 and 222, respectively, in which they are disposed so that they can be freely slidably moved therein. The upper end of the cylindrical portion 238 is provided with a cylindrical bore or recess 240 having two aligned elongated vertical slots 242 therein.

An elongated rod 244 which performs the same function as rod 52 in FIGURES 1 and 2 is slidably disposed within the tube 184. The lower end of the rod 244 is disposed to slide within the recess 240 and is provided with a cross pin member 248 having its opposite ends extending through the aligned vertical slots 242 of recess 240. The upper end of rod 244 is pivotally connected at 48 to the pivot lever 36. The handle 232 is adapted to lift the rod 244 into a cocked horizontal position by virtue of the elongated slots 242 which engage the pin 248 to raise the rod 244 when the handle 232 is moved upwardly. To lift the rod 244 the operator grasps the handle 232 with a forefinger and the finger grip 251 formed in the member 210.

The rod 244 is provided with an adjustable sleeve member 250 (see FIGURE 11) on the upper end thereof which can be adjustably secured at different vertical positions along the rod 244. The upper end of a biasing spring 252 is fixed to the sleeve 250.

Figure 14:
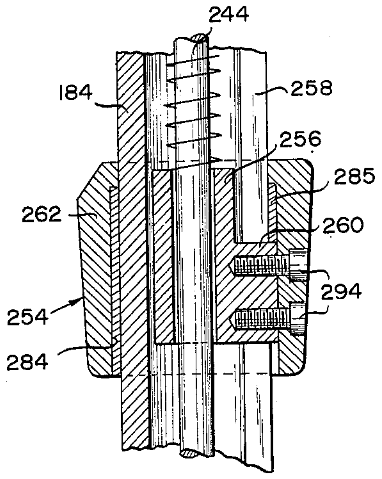
FIGURE 14 is an enlarged section, taken along the line 14—14 of FIGURE 10, illustrating the means for adjusting the tension force in the spring means embodied in the monitoring device of FIGURE 10.
Figure 15:
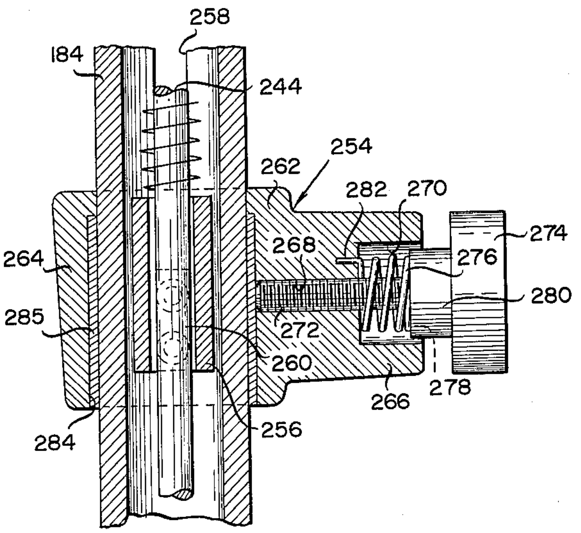
FIGURE 15 is an enlarged section, taken along the line 15—15 of FIGURE 11.

An adjustable member 254 is slidably disposed on the tube 184, as best shown in FIGURES 14 and 15. The adjustable member 254 is provided with a cylindrical insert member 256 through which the rod 244 slidably extends. The lower end of the biasing spring 252 is fixed or secured by any suitable means to the top of the insert member 256. A vertical groove 258 (FIGURES 14 and 15) is disposed in the rear side of the tube 184 and extends approximately three-quarters of the length of the tube. The groove is adapted to slidably receive therein an outwardly extending rectangular lug or member 260 disposed on the lower end of insert member 256.

Mounted on tube 184 is an adjusting sleeve 262 consisting of a vertical cylindrical tube or boss 264 provided with a horizontally extending cylindrical portion 266. Portion 266 is a solid structure and is provided with a threaded bore 268 extending therethrough and a countersink or recess 270 thereadjacent. A threaded screw member 272 is threadably connected within the threaded bore 268 and is provided with a circular handle or knob 274 fixed thereto. A torsion spring 276, having one end 278 fixed in a reduced section 280 of the knob and the other end 282 fixed in the portion 266, causes the threaded member 272 to constantly tend to be threaded home in the bore 268 in the event that an operator does not sufficiently tighten the knob 274. A thin tubular insert member or bushing 284 is disposed within the vertical cylindrical tube portion or boss 264 and around the outer surface of tube 184 with its upper edge 285 seating against a corresponding edge on 264. The cylindrical tube portion 264 and insert member 284 are secured to insert member 256 by two screws 294 extending through portion 260 and through two apertures in 284. The heads of screws 294 are countersunk in 264. The threaded member 272 is adapted to engage this tubular insert member 284 to secure the adjustable device 254 at predetermined vertical positions along the tube 184. Tubular insert member 284 and the cylindrical boss 264 are adapted to slide along the tube 184 when the knob 274 is loosened.

Adjusting device 254 is disposed on the tubular member, as best shown in FIGURE 10, so that the knob 274 is disposed adjacent one side of the tube 184.

The front wall or side of the tube 184, as best shown in FIGURE 10, is provided with a milled slot for receiving a graduated scale 286 therein. The scale 286 can be adjusted upwardly or downwardly by a thumb screw 288 threaded into the tube and securing the scale 286 in the recess. The scale is provided with various graduations as described before in connection with the other embodiment of the invention.

The infusion tube 98 has connected thereto a by-pass tube 288 (see FIGURE 11) adjacent its discharge end 290 and beyond the portion of the tube which is clamped off in recess 226 when a predetermined amount of infusion liquid has passed through the tube. The other end of the bypass tube 288 is connected through the bottle stopper 94 with the interior of the infusion liquid container. As shown in FIGURE 11, a conventional hypodermic needle 292 is affixed by any suitable means to the discharge end of the tube 290. Tube 288 has a hypodermic needle 291 on its lower end with a very fine bore which restricts the flow of fluid. Needle 291 is inserted into the injection site located behind needle 272 connecting it to delivery tube 288.

In operation of this embodiment of the infusion monitoring device, compensation should be made for any slight variation in the bottle weight. This is done by loosening knob 274 by turning it counterclockwise and raising the adjusting device 254 to the upper part of the scale. The knob 274 is then turned clockwise in order to secure the adjusting device 254 in position on the tube 184. The full bottle which is to be used is hooked on at the top of hook 46 and the pivoted lever 36 cocked by pulling down on the hook 46 so that the lever rests against the stop 176. Thereafter, the knob 274 is loosened and the adjusting device 254 is slowly lowered along the tube 184 until the bottle and the hook 46 jump up. The knob 274 is then tightened. The thumb screw 288 is then loosened and the scale 286 is adjusted so as to conform to the weight of the full bottle. Thereafter, the adjusting scale is secured in proper position by tightening the thumb screw. This bottle which is hooked onto 46 and the pivoted lever 36 is cocked by pulling the hook 46 downwardly so that the pivoted lever rests on the stop 176, as shown in FIGURE 11. The knob 274 is loosened and gradually pulled downwardly along the tube 184 until the hook 46 and bottle jump up.

If it is desired to empty or discharge a particular amount of liquid to be infused, the device 254 is slowly raised along the tube 184 to the volume read on the scale that is desired to be delivered from the container upon completion of the infusion. For example, if a container with 500 milliliters of infusion liquid therein is used and it is desired to discharge therefrom 200 milliliters of infusion liquid, the device 254 is raised along the scale until a reading of 200 milliliters is reached. As the infusion liquid is dispensed through the flexible tube, the weight of the bottle with its liquid content will be less than it was originally and as it approaches the forces in the biasing spring 252 which exceeds the weight of liquid to be left in the bottle, the lever 36 will be set off with its front end pivoting upwardly and its rear end pivoting downwardly.

Since the upper end of the spring 252 is fixed to the rod 244, the spring will pull the rod downwardly so that the lower end of the rod 244 impinges against the bottom of the recess 240 and forces the cylindrical portion 238 downwardly so that neck portion 236 impinges against the flexible tube disposed in the slot 226 to pinch or close it off and stop the discharge of the infusion liquid through the flexible tube.

As the front end of the pivoted lever 36 raises or pivots upwardly, the lower front edge 39 of the pivoted lever 36 rides above the centerline of bearing member 136 so that the bearing will ride underneath the lever, and causes it to be pushed upwardly with a greater force than is normally exerted upon it by the biasing spring 252. Thus, the overcenter spring-actuated pressure lever device causes the flexible tube to be pinched off or closed off in a positive and snap action manner.

In the embodiment of the invention shown in FIGURES 10 and 11, the bypass tube 288 is not shut off by this action but there is a greatly diminished flow of liquid through the bypass tube 288 to the hypodermic needle.

Sinmultaneously with the tripping of the lever 36, the device shown in FIGURES 10 and 11 may have a mercury switch, as already described in connection with the first embodiment of the invention, closed so that a chime, or a light bulb, in cover 170 may signal that the device has discharged its predetermined amount of liquid.

Another switch may be incorporated in the apparatus, either in addition to or in place of the already mentioned switch 140. This switch, when actuated in the infusion monitor, will alert the nurse through the nurse call system which is now in operation in the hospital at the present time. To connect the infusion monitor to the nurse call system, the infusion monitor has a wire connected to the internal switch and terminating in an external plug. The plug is inserted into the receptacle at the patient's bedside.

Figure 19:
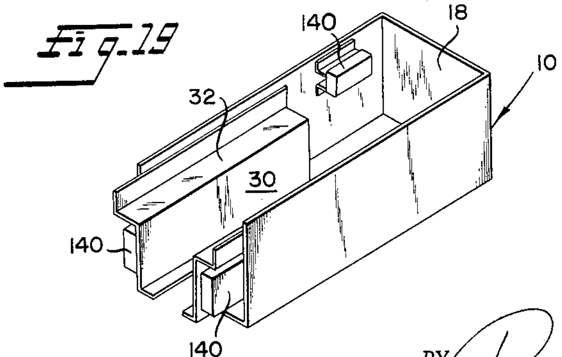
FIGURE 19 is a perspective view illustrating various positions where the switches may be disposed in the housing.

Referring to FIGURES 1, 2 and 19, two switches 140 may be inserted toward the front of the apparatus on the left or right side; or referring to FIGURE 11, the switch 140 may be located above the lever 36, midway between 38 and 48.

From the foregoing detailed description, it is apparent that the present invention provides an infusion monitoring device which will stop or cut off the discharge of infusion liquid to patient when the contents of the infusion bottle have reached a predetermined level or quantity. It is also apparent that the present invention provides a completely mechanically operated infusion monitoring device which does not depend upon any available power outlet or external source for its operation, but is completely self-contained and self-actuating.

The present invention further provides an overcenter spring-actuated pressure lever means operatively connected to a pivoted lever means, which overcenter spring-actuated pressure lever means is actuated upon actuation of the pivoted lever so as to trigger the pivoted lever means or give it a snap action by pushing it upwardly at the front end thereof with a greater force than is normally exerted upon it by the biasing means connected to the pivoted lever.

Inasmuch as various changes may be made in the form, location and relative arrangement of the several parts without departing from the essential characteristics of the invention, it will be understood that the invention is not to be limited except by the scope of the appended claims.

What is claimed is:

1. An infusion monitoring device comprising a housing with a pivoted lever therein, liquid container means suspended from one end of said lever, tube means extending below said housing, plunger means pivotally connected to the other end of said lever and slidably disposed in said tube means, flexible dispensing means in communication with said container and carried by said tube means for discharging liquid from said container, said plunger means being disposed to pinch off said dispensing means when a predetermined quantity of liquid has been discharged from said container, biasing means mounted on said plunger means and having one end fixed to said plunger means, adjustable means for varying the force in said biasing means slidably disposed on said plunger means, the other end of said biasing means being fixed to said adjustable means, said plunger means being actuated by said biasing means to pinch off said dispensing means when a predetermined quantity of liquid has been discharged from said container.

2. The device of claim 1 wherein said lever is pivotally connected to said housing at approximately its midpoint.

3. The device of claim 1 wherein said adjustable means includes an arm member through which said plunger means extends in a slidable fit, and said tube means is externally threaded, and a threaded member is disposed thereon and bears against said arm member.

4. The device of claim 3 wherein an overcenter spring-actuated pressure lever means is provided for pivoting said pivoted lever with a greater force than that normally exerted upon it by said biasing means.

5. The device of claim 1 wherein said adjustable means includes an insert member through which said plunger member slidably extends and to which the other end of said biasing means is fixed, and a tubular member mounted over said tube means and slidable thereon, said insert member being fixed to said tubular member, and spring means on said tubular member constantly urging said tubular member against said tube means.

6. The device of claim 4 wherein an overcenter spring-actuated pressure lever means is provided for pivoting said pivoted lever with a greater force than that normally exerted upon it by said biasing means.

7. An infusion mounting device comprising a housing with a vertical tube secured to one end thereof and extending downwardly therefrom, a horizontal pivoted lever disposed in said housing, an infusion liquid container suspended from one end of said lever, a rod member pivotally connected to the other end of the lever and extending down into said tube and slidably disposed therein, a flexible tube connected to said container for discharging liquid therethrough, recess means in the lower portion of said tube in alignment with said rod member adapted to support the lower end of said flexible tube therein, a vertically slidable member disposed in said tube, said rod member extending through said slidable member in a sliding fit therethrough, a biasing spring mounted over said rod member with its upper end secured to said rod member and its lower end secured to said slidable member, adjusting means for moving said slidable member downwardly and permitting it to be pulled upwardly along said tube to vary the tension in said biasing spring, said rod member being disposed to pinch off the portion of flexible tube in said recess means when said rod member is pulled downwardly, said biasing spring being disposed to pivot said one end of the lever upwardly and the other end downwardly when the spring force exceeds the weight of liquid remaining in said container.

8. The device of claim 7 wherein said tube is provided with aligned vertical slots on opposite sides thereof and said slidable member has arms extending therethrough, and said adjusting means is a nut threaded on the outside of said tube adapted to bear against said arms.

9. The device of claim 7 wherein suspension members are provided with V-grooves adjacent the upper and lower ends of said tube, and clamping means are connected to said upper suspension member for attaching it to the vertical rod of an intravenous stand.

10. The device of claim 7 wherein an overcenter spring-actuated pressure lever means comprising a pivoted channel member with a roller bearing member carried therein is provided adjacent said one end of the pivoted lever to pivot said one end upwardly with a greater force than that normally exerted upon it by said biasing means.

11. The device of claim 10 wherein the center line of said roller bearing member is located in a plane above the bottom of said pivoted lever when said pivoted lever is disposed in a substantially horizontal position and below said bottom when said pivoted lever is actuated by said biasing means.

12. The device of claim 7 wherein said tube is provided with a slot in the rear thereof, and said slidable member has a portion extending therethrough and a cylindrical sleeve member mounted around the outside of said tube and adapted to slide thereon, and an insert biasing member continuously biasing said slidable member in a fixed position along said tube.

13. The device of claim 12 wherein said insert biasing member consists of a threaded member threaded into said sleeve member, and a torsion spring disposed to continuously press said sleeve member against said tube.

14. The device of claim 7 wherein by-pass flexible tube means is provided and adapted to have its opposite ends in communication with said first mentioned flexible tube on opposite sides of said recess means to permit a minute amount of liquid to be dispensed from said container when said rod member pinches off a flexible tube disposed in said recess means.

15. The device of claim 7 wherein signal means are operatively connected to said pivoted lever for actuation by the pivoting of said pivoted lever by said biasing means.

16. An infusion monitoring device comprising a pivoted lever, liquid container means suspended from one end of said lever, vertical support means adjacent the other end of the lever, plunger means pivotally connected to the other end of the lever, said lever and plunger means carried by said support means, flexible dispensing means in communication with said container means and carried by said support means, said plunger means being disposed to pinch off said dispensing means when a predetermined quantity of liquid has been discharged from said container means, biasing means having one end fixed to said plunger means, adjustable means adjacent said plunger means for varying the force in said biasing means, the other end of said biasing means being fixed to said adjustable means, said plunger means being actuated by said biasing means to pinch off said dispensing means when a predetermined quantity of liquid has been discharged from said container means, and a snap action member disposed adjacent said one end of said lever comprising a roller member having a center line located in a plane above the bottom of said pivoted lever when said pivoted lever is disposed in a substantially horizontal position and below said bottom when said pivoted lever is actuated by said biasing means, and other biasing means urging said roller member against said lever bottom.

References Cited by the Examiner

UNITED STATES PATENTS

| | | | |
|---|---|---|---|
| 589,806 | 9/1897 | Bard | 128—227 |
| 1,035,301 | 8/1912 | Bartlett | 137—419 |
| 1,850,159 | 3/1932 | Scovel | 137—418 |
| 2,478,876 | 8/1949 | Nelson | 128—227 |
| 2,835,252 | 5/1958 | Mauchel | 128—214 |
| 3,105,490 | 10/1963 | Schoenfeld | 128—214 |
| 3,115,152 | 12/1963 | Goldberg et al. | 128—214 X |

FOREIGN PATENTS

| | | |
|---|---|---|
| 1,288,411 | 2/1962 | France. |

RICHARD A. GAUDET, *Primary Examiner.*

D. L. TRULUCK, *Assistant Examiner.*